(12) United States Patent
Rampogna et al.

(10) Patent No.: US 7,213,127 B2
(45) Date of Patent: May 1, 2007

(54) SYSTEM FOR PRODUCING ADDRESSES FOR A DIGITAL SIGNAL PROCESSOR

(75) Inventors: Flavio Rampogna, Geneva (CH); Pierre-David Pfister, Sonceboz (CH); Jean-Marc Masgonty, Marin (CH); Christian Piguet, Neuchatel (CH)

(73) Assignee: CSEM Centre Suisse d'Electronique et de Microtechnique SA - Recherche et Developpement, Neuchatel (CH)

( * ) Notice: Subject to any disclaimer, the term of this patent is extended or adjusted under 35 U.S.C. 154(b) by 233 days.

(21) Appl. No.: 10/455,808

(22) Filed: Jun. 6, 2003

(65) Prior Publication Data

US 2004/0034758 A1 Feb. 19, 2004

(30) Foreign Application Priority Data

Jun. 6, 2002 (EP) ................................. 02291405

(51) Int. Cl.
*G06F 12/06* (2006.01)
(52) U.S. Cl. ........................................ 711/220; 711/217
(58) Field of Classification Search ................ 711/220, 711/214, 217, 218
See application file for complete search history.

(56) References Cited

U.S. PATENT DOCUMENTS

| | | | | |
|---|---|---|---|---|
| 5,450,553 A * | 9/1995 | Kitagaki et al. | ............. | 711/214 |
| 5,678,037 A * | 10/1997 | Osugi et al. | ................. | 345/562 |
| 5,918,252 A * | 6/1999 | Chen et al. | .................. | 711/217 |
| 5,918,253 A * | 6/1999 | Kadowaki | .................... | 711/220 |
| 6,038,584 A | 3/2000 | Balmer | ......................... | 709/40 |
| 6,105,126 A * | 8/2000 | Check et al. | ................ | 712/210 |
| 6,163,836 A * | 12/2000 | Dowling | ....................... | 712/37 |
| 6,209,076 B1 * | 3/2001 | Blomgren | .................... | 711/214 |
| 6,363,469 B1 * | 3/2002 | Okamoto et al. | ............. | 711/220 |
| 6,401,196 B1 * | 6/2002 | Lee et al. | ..................... | 712/241 |
| 6,453,405 B1 * | 9/2002 | Hoyle et al. | ................. | 711/201 |
| 6,457,115 B1 * | 9/2002 | McGrath | ..................... | 711/220 |
| 6,463,518 B1 * | 10/2002 | Duboc | ......................... | 711/220 |
| 6,539,467 B1 * | 3/2003 | Anderson et al. | ........... | 711/219 |
| 6,567,910 B2 * | 5/2003 | Tessarolo et al. | ............ | 712/227 |
| 6,647,484 B1 * | 11/2003 | Jiang et al. | .................. | 711/220 |

FOREIGN PATENT DOCUMENTS

WO 01/98893 12/2001

* cited by examiner

*Primary Examiner*—Pierre Bataille
*Assistant Examiner*—Sheng-Jen Tsai
(74) *Attorney, Agent, or Firm*—Jacobson Holman PLLC

(57) ABSTRACT

A system for generating addresses for a digital signal processor in which the program instructions include a code for accessing a memory associated with said processor. An address calculation circuit calculates each access address to the memory on the basis of operation codes designated by the address generation code of one of the instructions and of the content of one address register selected from said address registers. Each address generation code defines an operation code to be sent to the calculation circuit. Each of the address registers is further associated with a configuration register designated at the same time as the address register by the address generation code, and each of the configuration registers contains a set of predefined operation codes, each adapted to command a predetermined calculation operation in the calculation circuit.

22 Claims, 7 Drawing Sheets

FIG.3

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | PR2 | | | PR1 | | | | PR0 | | | | OPFA/RC5 | | | | tx/yn
Access   l/e   l/e   l/e   l/e
RAZ    0  0   0   0   0   0   0   0   0   0   0   0   0   0   0   0

FIG.4

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| PREADR | | | POSAD1 | | | | POSAD2 | | | POSATR1 | | OR | | MR1 | | | POSTR2 | | MR2/RCR | | OPFA/RC5 | | | ix/yn
Access  l/e   l/e   l/e   l/e   l/e   l/e   l/e   l/e   l/e
RAZ    0   0   0   0   0   0   0   0   0   0   0   0   0   0   0   0   0   0   0   0   0   0   0   0

SYSTEM FOR PRODUCING ADDRESSES FOR A DIGITAL SIGNAL PROCESSOR

FIELD OF THE INVENTION

The present invention relates to a system for generating addresses for a digital signal processor (DSP) for accessing at least one memory associated with said processor.

BACKGROUND OF THE INVENTION

The addressing of the data and coefficient memory or memories of DSP is of primary importance. For this reason, DSP include complex "automatic" address generation mechanisms that operate in parallel with mechanisms executing arithmetic operations. The addressing capabilities of the memories most typically used in current DSP rely on an address or index register, an offset register, and a modulo register. Thus a memory is addressed by means of an address register, and the value in the address register can be modified for each memory access by the value or values contained in the offset and/or modulo register(s).

Furthermore, DSP generally include two address generation systems that feed the arithmetic unit simultaneously and work with two separate memories. For example, two values can be multiplied and the result added to the value in an accumulator register by a call to only one program instruction.

However, this necessitates long instructions comprising a large number of bits, which makes the hardware costly.

Accordingly, an instruction must in particular specify:
the arithmetic operation to be executed,
in which register to place the result,
an addressing register appropriate for the memory,
the operation to be executed on the content of the addressing register,
the appropriate offset register,
the appropriate modulo register,
another addressing register appropriate for the memory,
the operation to be executed on the content of the other addressing register,
the offset register appropriate for the other addressing register, and
the modulo register appropriate for the other addressing register.

To avoid excessively large instructions, the capabilities of DSP must be limited to strictly what is required to execute a particular number of specific algorithms, thus ruling out flexible use of DSP. For example, imposition of the following limitations has to be accepted:
small number of arithmetic operations,
small number of storage registers,
small number of addressing registers,
small number of operations on the addressing registers, and
fixed selection of the offset and modulo registers associated with the addressing register in a way that cannot be modified.

An object of the invention is to provide a system for generating addresses that circumvents at least some of the limitations set out above and achieves flexibility in the choice of the algorithms that can be executed, using instructions much shorter than the instructions conventionally used in DSP.

SUMMARY OF THE INVENTION

The invention therefore provides a system for generating addresses for a digital signal processor adapted to execute a program whose program instructions include an address generation code for accessing at least one memory associated with said processor, which system includes:

a set of address registers each associated, if necessary, with an offset register and/or a modulo register, an address calculation circuit which calculates each access address to said at least one memory on the basis of operation codes designated each time by the address generation code of said program instructions and the content of one address register selected from said address registers, and if necessary its associated registers, each address generation code of each program instruction defining one of said operation codes to be sent to said address calculation circuit and designating the address register whose content must be subjected to a calculation operation, and control means which selectively transfer the contents of said address registers and of said operation code to said address calculation circuit in dependence upon said address generation code.

wherein, each address register of said address registers is further associated with a configuration register designated at the same time as said address register by said address generation code, each of said configuration registers contains at least one set of predefined operation codes each adapted to control a predetermined calculation operation in said address calculation circuit, and said control means are adapted to transfer selectively said predefined operation codes to said calculation means, in dependence upon the value of at least a first bit of said address generation code.

Thanks to these features, a program instruction necessitates only a minimum number of bits for defining the address calculation operations, and the remainder of the instructions can be assigned to other functions.

BRIEF DESCRIPTION OF THE DRAWINGS

Further features and advantages of the present invention will become apparent in the course of the following description, which is provided by way of example only and with reference to the accompanying drawings.

FIGS. 3 and 4 show the distribution of the fields of some registers shown in FIG. 2

DETAILED DESCRIPTION OF THE PREFERRED EMBODIMENT

Figure 1:
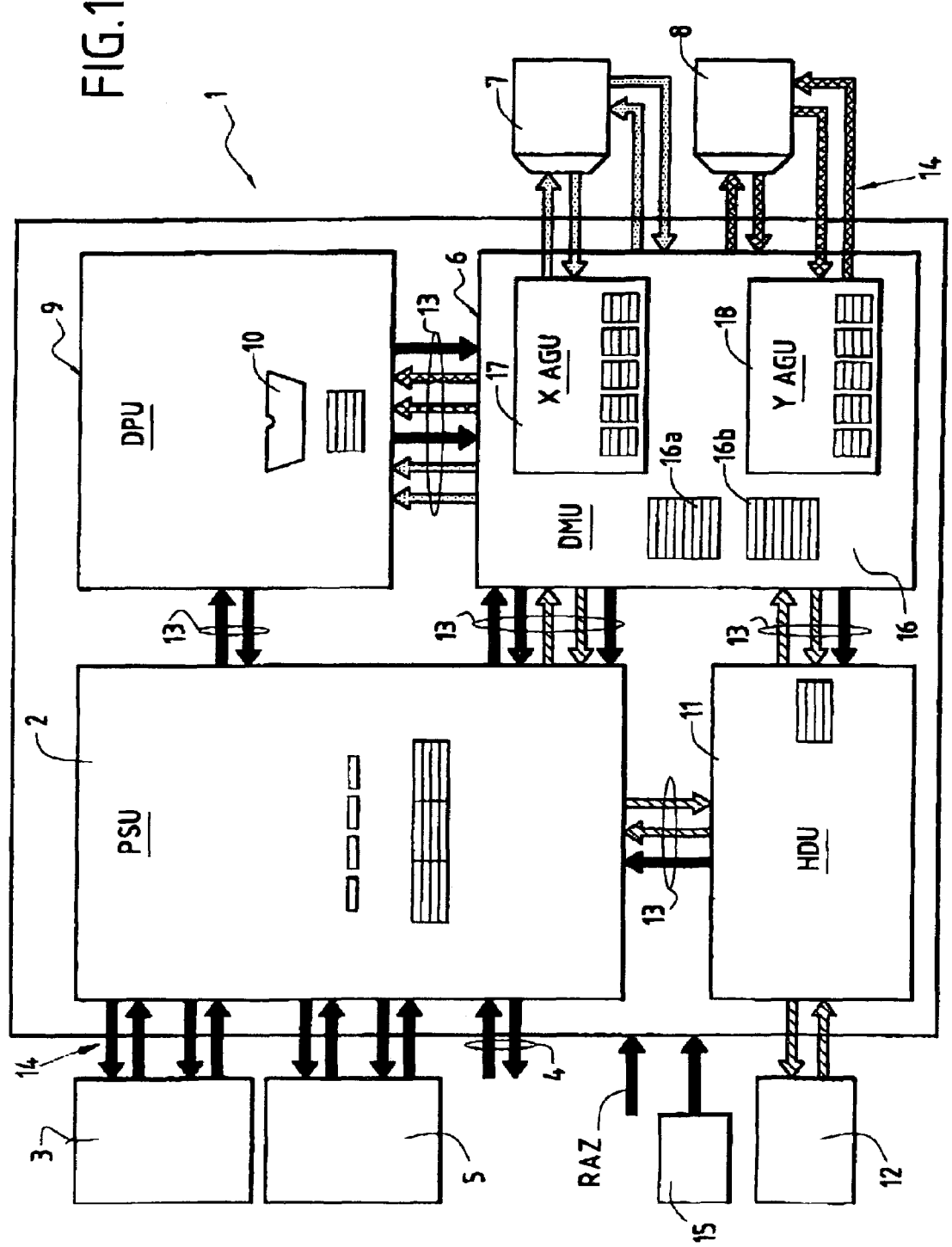
FIG. 1 is a block diagram of the general architecture of a DSP in which the method according to the invention can be used.

FIG. 1 shows one example of the overall architecture of a DSP 1 including an address generation system according to the invention. The processor essentially comprises four functional units, namely:

a) A program sequencing unit (PSU) 2 which manages the extraction of program instructions from a program memory 3, decodes instructions, executes branches, calls subroutines, program interrupts commanded externally and in transit on a bus 4, etc. It communicates with a random access memory (hardware stack) 5 in which are stored return addresses (in particular of subroutines and exceptions) and loop states.

b) An address generation and data management unit 6, also known as a data move unit (DMU), whose function and structure constitute the specific subject matter of the invention and which is described in detail later. The DMU 6 communicates with two data memories 7 and 8 which it addresses and from which it extracts data.

c) A data processing unit (DPU) 9 including in particular an arithmetic and logic unit (ALU) 10. The DPU 9 is adapted to execute as and when required algorithms for applications as varied as sound or picture analysis and calculation of matrices, vectors, etc.

d) A unit 11 for communicating with an external processor, also known as a host and debug unit (HDU). The HDU 11 can communicate with an external processor 12, for example to load program instructions and/or data into the memories 3, 7 and 8 via the processor 1, or transfer parameters, or apply status checks regarding the execution of the algorithm in the processor 1. A software repair function can also be provided by way of the HDU 11.

It should be noted that the units 2, 9 and 11 are familiar to the person skilled in the art and are not directly relevant to the invention. For this reason they are not described in more detail.

The processor 1 includes internal buses 13 and external buses 14 for communication between the units and peripherals just referred to. Operation is timed by a clock 15.

The address generation unit 6 includes a data manipulation unit 16 formed by two groups of general application registers 16a and 16b (see also FIG. 2), which cooperate with the memories 7 and 8, respectively, with which they can exchange data during execution of the program. The general application registers 16a and 16b can also be used as temporary registers when transferring data between the units of the processor 1 and the memories 7 and 8. They can also contain operands for the data processing unit 9.

In the embodiment described with reference to FIG. 1, and in a manner that is known in the art, the processor 1 uses double addressing enabling parallel access to two values stored in memory or in the registers that are simultaneously applied to the registers and to the DPU 9. For example, the two values can be multiplied together and the result of the multiplication can be transferred into an accumulator register in the data processing unit 9. It is for this reason that the processor 1 includes the two data memories 7 and 8, and the address generation unit consequently includes two address generation systems 17 and 18 working in parallel. These systems, also referred to as the X and Y address generation units (AGU) are designed in accordance with essential features of the invention. However, an address generation unit in accordance with the invention can also be of benefit in a processor designed to use single addressing.

The systems 17 and 18 generate addresses for indirect access to their associated memory 7 or 8 via registers. As they have an identical structure, only the system 17 is described.

Figure 2:
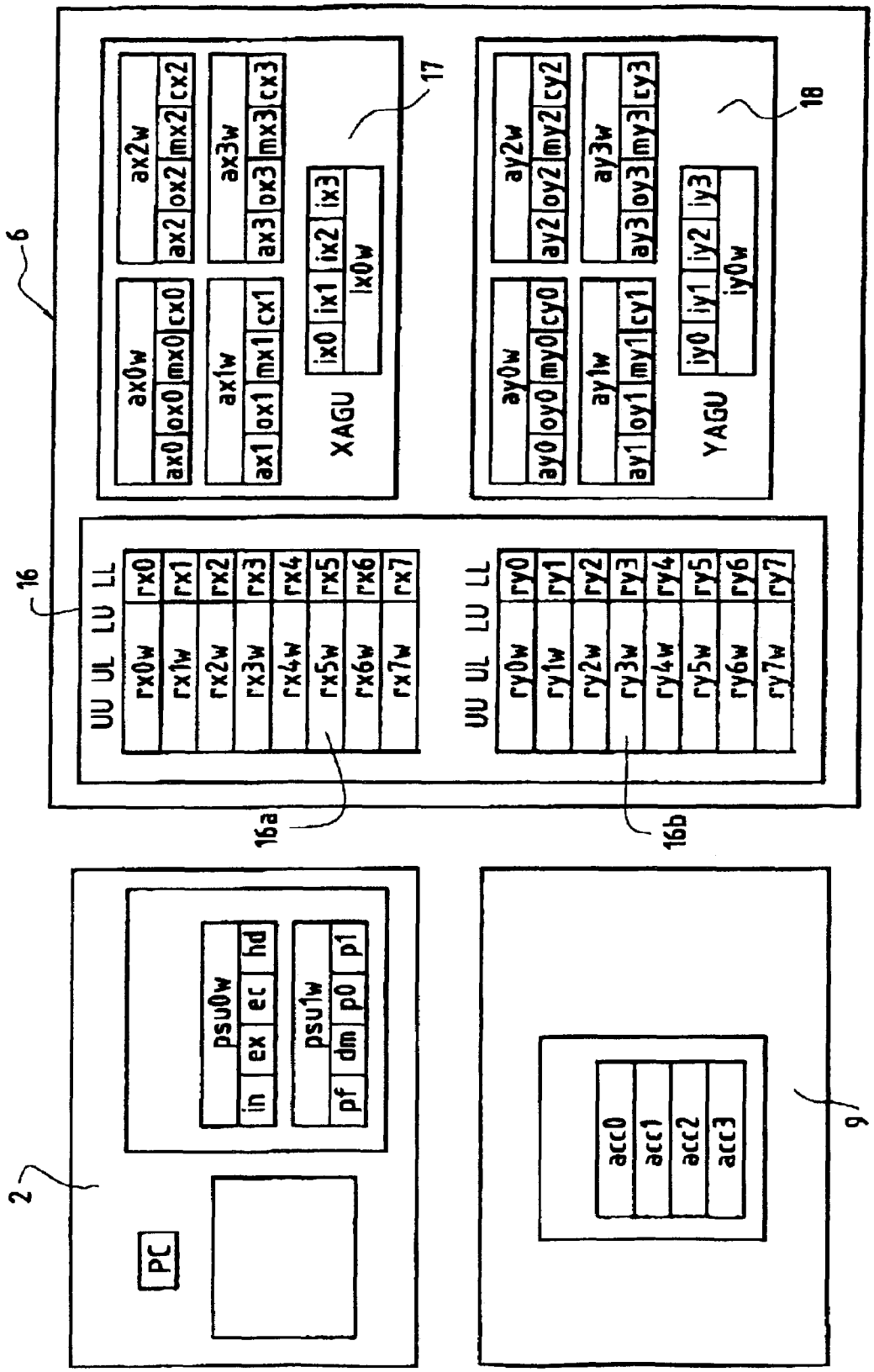
FIG. 2 is a symbolic representation of some registers and sets of registers used in the FIG. 1 DSP.

FIG. 2 shows that the system 17 includes five groups ax0w to ax3w and ix0w each of four registers. The registers ax0w to ax3w each include:

a base address register or index register ax0, ax1, ax2 and ax3 adapted to contain the data memory address that is accessed in the case of indirect access to the data memory 7, an increment/decrement register or offset register ox0, ox1, ox2, ox3 containing the increment/decrement value for the basic address when the latter must be modified subsequently during execution of the program.

a modulo register mx0, mx1, mx2, mx3 for specifying a modulo value associated with an address modified subsequently when it is a question of indirectly addressing a data memory involving a subsequent address modification, and a configuration register cx0, cx1, cx2 and cx3 for configuring indirect access to the data memory 7 for the corresponding indices.

The fifth group ix0w of registers includes four extended instruction registers ix0, ix1, ix2 and ix3.

It will also be noted in FIG. 2 that the registers of the sets 16a and 16b are respectively numbered from rx0 to rx7 or from ry0 to ry7 if they contain only one data word and from rx0w to rx7w or from ry0w to ry7w if they contain four data words at a time, the use of the number of words being optional (Is a function of the program) and depending on the algorithms to be executed by the processor 1.

It should be noted that the registers in the units 2 and 9 are also shown in FIG. 2. However, as they are not directly relevant to the invention, they are not described in detail.

In a preferred embodiment of the invention, the width of the registers that have just been described corresponds to the width of the data words used in the processor 1, a width of 24 bits being preferred, except for the configuration registers cx0 to cx3, which preferably have a width of 20 bits.

Table 1 below shows one example of what one of the configuration registers cx0 to cx3 can contain and FIG. 3 shows the distribution of the fields and one example of the content of one such register, here referenced cx/yn to indicate that it is a configuration register n selected from the four configuration registers for the units X AGU and Y AGU, respectively. FIG. 3 also shows that all the fields can be used in read/write mode. Writing can be executed by program instructions specifically provided for this purpose and whose function is to modify, as required, the content of the register concerned. Also, all locations of the register can be reset to the initial state at the value "0".

TABLE 1

| FIELD | FUNCTION | BIT/FIELD | DESCRIPTION | | | |
|---|---|---|---|---|---|---|
| PR0 | Predefined operation | 4 bits | 0 | an=an+1 (nma) | 1 | an=an−1 (nma) |
| | | | 2 | an=an+on (nma) | 3 | an=an−on (nma) |
| | | | 4 | an=(an+on)%mn (nma) | 5 | an=(an−on)%mn (nma) |
| | | | 6 | addr=an+on,an=an+on | 7 | an=an+OFFA (nma) |
| | | | 8 | addr=an, an=an+1 | 9 | addr=an−1, an=an−1 |
| | | | A | addr=an, an=an+on | B | addr=an, an=an−on |
| | | | C | addr=an, an=(an+on)%mn | D | addr=an, an=(an−on)%mn |
| | | | E | addr=an | F | addr=an, an=an+OFFA |
| PR1 | Predefined operation | 4 bits | 0 | an=an+1 (nma) | 1 | an=(an+1)%mn (nma) |
| | | | 2 | an=an+on (nma) | 3 | an=(an+1)%mn+OFFA (nma) |
| | | | 4 | an(an+on)%mn (nma) | 5 | an=(an+on)%mn+OFFA (nma) |
| | | | 6 | addr=an+on, an=an+on | 7 | an=(an+OFFA)%mn+1 (nma) |
| | | | 8 | addr=an, an=an+1 | 9 | addr=an, an=(an+1)%mn |
| | | | A | addr=an, an=an+on | B | addr=an, an=(an+1)%mn+OFFA |
| | | | C | addr=an, an(an+on)%mn | D | addr=an, an=(an+OFFA)%mn+1 |
| | | | E | addr=an | F | addr=an, an=(an+OFFA)%mn+1 |
| PR2 | Predefined operation | 4 bits | 0 | an=an+1 (nma) | 1 | an=(an+1)%mn (nma) |
| | | | 2 | an=an+OFFA (nma) | 3 | an=(an+1)%mn+OFFA (nma) |
| | | | 4 | an=(an+OFFA)%mn (nma) | 5 | an=(an+on)%mn+OFFA (nma) |
| | | | 6 | addr=an+OFFA, an=an+OFFA | 7 | an=(an+OFFA)%mn+1 (nma) |
| | | | 8 | addr=an, an=an+1 | 9 | addr=an; an=(an+1)%mn |
| | | | A | addr=an, an=an+OFFA | B | addr=an, an=(an+1)%mn+OFFA |
| | | | C | addr=an, an=(an+OFFA)%mn | D | addr=an, an=(an+on)%mn+OFFA |
| | | | E | addr=an | F | addr=an, an=(an+OFFA)%mn+1 |
| OFFA | OFFset B Used only with an extended operation | 3 bits | 0 | 1 | 1 | 2 |
| | | | 2 | 3 | 3 | 4 |
| | | | 4 | −4 | 5 | −3 |
| | | | 6 | −2 | 7 | −1 |
| W | Wide memory data transfer | 1 bit | 0 | Narrow word | 1 | Wide word |

In table 1:

an is the content of the address register to be generated, on is the offset register associated with the configuration register concerned, %mn is the modulo register associated with the configuration register concerned, and nma signifies "no memory access".

The following examples will facilitate reading table 1.

A hexadecimal value C in the field PR0 means that the address is determined by the sum of the content of the index register an and the value on from the associated offset register multiplied by the value % mn from the associated modulo register. A hexadecimal value F of the field PR0 means that the address is equal to the value of the index register an plus the content of the field OFFA.

Table 2 below sets out an example of what one of the extended instruction registers ix0 to ix3 can contain, and FIG. 4 shows the distribution of the fields and one possible example of the content of the fields of one such register. In a similar manner to FIG. 3, the extended instruction register shown in FIG. 4 is referenced ix/yn, signifying that it is a register n selected from the four extended instruction registers for the units X AGU and Y AGU, respectively. FIG. 4 also indicates that all the fields can be read and written. As for the configuration registers, they can be written by program instructions specifically provided for this purpose and whose function is to modify the content of the register concerned, as and when required. Also, some locations of the register can be reset to the initial state to the value "0". In the example described here, it is assumed that an extended instruction is defined on 24 bits.

TABLE 2

| FIELD | FUNCTION | BITS | | DESCRIPTION | | |
|---|---|---|---|---|---|---|
| PREAD | Generate premodified address for | 3 bits | 0 | addr=ax|yn | 1 | addr=ax|yn+OFFB |
| | | | 2 | addr=ax|yn+MR1 | 3 | addr=ax|yn−MR1 |
| | | | 4 | addr$_{MSB}$=ax|yn$_{MSB}$ | 5 | addr=ax|yn+OR |

TABLE 2-continued

| FIELD | FUNCTION | BITS | | DESCRIPTION | | |
|---|---|---|---|---|---|---|
| | access to current memory: part of the instruction | 6 | | $addr_{LSB}=shr(ax|yn_{LSB})$<br>$LSB=log2(MR)>addr_{LSB}(MR)=0$<br>addr=ax|yn-OR | 7 | |
| POSAD1 | Generate postmodified address; First part of the extended instruction | 4 bits | 0<br>2<br>4<br>6<br>8<br>A | RES1=ax|yn+MR1<br>RES1=ax|yn+OR<br>RES1=ax|yn+MR2<br>RES1=ax|yn+OFFB<br>RES1=(ax|yn+OR)%MR1<br>RES1=(ax|yn+OFFB)%MR1 | 1<br>3<br>5<br>7<br>9<br>B | RES1=ax|yn-MR1<br>RES1=ax|yn-OR<br>RES1=ax|yn-MR2<br>"0"<br>RES1=(ax|yn-OR)%MR1<br>$addr_{MSB}=ax|yn_{MSB}$,<br>$addr_{LSB}=0$<br>$LSB=log2(MR)$ |
| | | | C<br>E | RES1=(ax|yn+1)%MR1<br>ax|yn+RCS | D<br>F | RES1=(ax|yn-1)%MR1<br>OR+RCS |
| POSAD2 | Generate postmodified address; Second part of the extended instruction | 4 bits | 0<br>2<br>4<br>6<br>8<br>A<br>C<br>E | RES2=RES1+1<br>RES2=RES1+OFFB<br>RES2=RES1-MR2<br>RES2= (MR1,#IMM4)<br>RES2= (RES1,#IMM4)<br>RES2=AR<br>RES2=MR2<br>RES2=OR+OFFB | 1<br>3<br>5<br>7<br>9<br>B<br>D<br>F | RES2=RES1-1<br>RES2=RES1+MR2<br>RES2=RES1+2*MR2<br>RES2=(MR2,#IMM4)<br>RES2=(OR,#IMM4)<br>RES2=OR<br>RES2=OR+MR2<br>RES2=MR2+OFFB |
| POSTR1 | Destination register for POSAD2-RES2 | 2 bits | 0<br>2 | <br>OR=RES1 | 1<br>3 | ax|yn=RES1<br>MR2=RES1 |
| POSTR2 | Destination register for POSAD2-RES2 | 2 bits | 0<br>2 | MR1=RES2<br>OR+RES2 | 1<br>3 | ax|yn=RES2<br>MR2=RES2 |
| OR | Offset register ox/yn | 2 bits | 0<br>2 | ox|y0<br>ox|y2 | 1<br>3 | ox|y1<br>ox|y3 |
| MR1\2 | Modulo register mx/yn | 2 bits | 0<br>2 | mx|y0<br>mx|y2 | 1<br>3 | mx|y1<br>mx|y3 |
| OFFB | Offset (-64 . . . +64) | 7 bits | 0<br>2<br>4<br>6 | 1<br>3<br>-4<br>-2 | 1<br>3<br>5<br>7 | 2<br>4<br>-3<br>-1 |
| RCR | Selection of radix of inverse remainder | 2 bits | 0<br>2 | radix-2<br>Reserved | 1<br>3 | radix-4<br>Reserved |
| RCS | Dimension of inverse remainder interval radix-2/radix-4 | 3 bits | 0<br>2<br>4<br>6 | Dimension of interval $2^4/2^4$<br>Dimension of interval $2^6/2^8$<br>Dimension of interval $2^8/2^{12}$<br>Dimension of interval $2^{10}/2^{16}$ | 1<br>3<br>5<br>7 | Dimension of interval $2^5/2^8$<br>Dimension of interval $2^7/2^{10}$<br>Dimension of interval $2^9/2^{14}$<br>Dimension of interval $2^{11}/2^{18}$ |

Table 2 is read in the same way as table 1, RES 1 and RES 2 respectively signifying "result 1" and "result 2".

Figure 5:
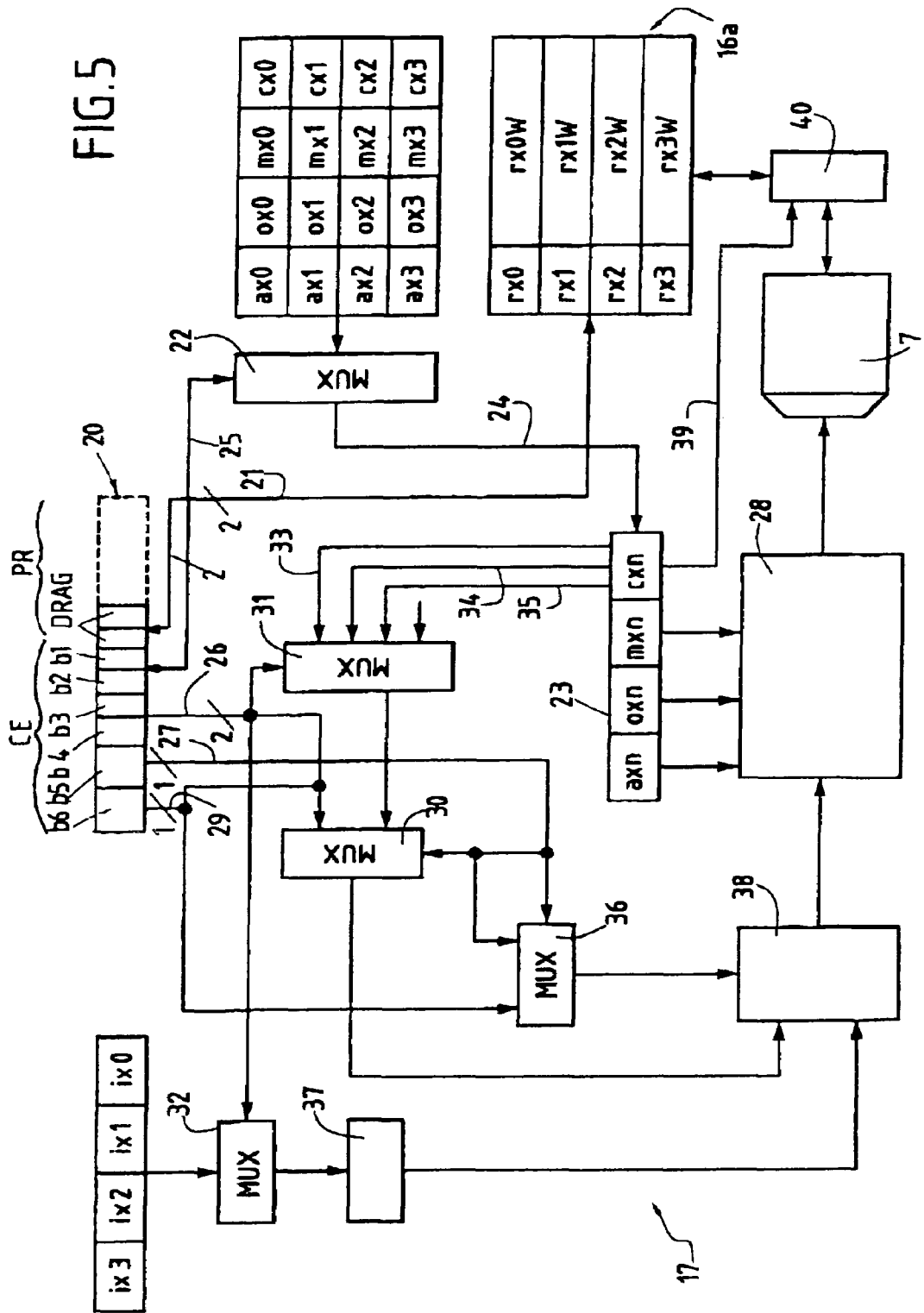
FIG. 5 is a block diagram of an address generation unit used in the FIG. 1 DSP.

FIG. 5 is a detailed diagram of the address generation unit 17 (X AGU), the address generation unit 18 (Y AGU) having the same structure. The latter is therefore not described in detail.

The program instruction coming from the sequencing unit 2 is assumed to be placed in a register 20 including a field into which the part of the instructions containing the address generation code CE used in the system according to the invention is loaded. Of course, the register 20 can contain the remaining part PR of the instructions (not shown), which is generally much larger than the part for the address generation code CE, since an instruction can be defined on 32 bits in total, for example. In the example described here, the address generation code CE comprises 6 bits numbered from b1 to b6. Thus the address generation system 17 uses only six bits of an instruction.

In each instruction, the remaining part PR not assigned to address generation comprises two bits DRAG designating general application registers for selecting a general application register rx0 to rx3 or rx0w to rx3w (in the narrow or large version respectively) from a set of registers via a line 21.

Two bits b1 and b2 of the address generation code CE are transferred over a line 25 to a multiplexer 22 which chooses, in dependence upon the value of these two bits, which of the four index or address registers ax0 to ax3 and their respective associated offset, modulo and configuration registers will be used to generate an address at a given time in the execution of the program. The multiplexer 22 places the content of the selected registers into a temporary register 23 via a line 24.

Two other bits b3 and b4 of the address generation code on a line 26 define operations that are executed for address calculations. The process initiated by these bits is explained later.

Another bit b5 appearing on a line 27 defines the choice between a basic operation or a predefined operation, on the one hand, and an extended operation, on the other hand, all of these operations being implemented in a hardwired logic address calculation circuit 28 that applies these operations to the contents of the index registers and the associated offset and modulo registers selected by means of the multiplexer 22 and placed in the register 23. The address calculated in the circuit 28 is used directly to address the memory 7.

Finally, a last bit b6 of the address generation code appearing on a line 29 defines the choice between a predefined operation and an extended operation.

The value of the bits b3 and b4 also sets two multiplexers 31 and 32. The multiplexer 31 selects one of the three fields PRO, PR1 and PR2 defining predefined operations forming part of the content of a configuration register cx0 to cx3, the codes of these fields being respectively transferred over the lines 33, 34 and 35. The output of the multiplexer 31 constitutes one of the inputs of the multiplexer 30.

The value of the bit b5 is applied to the control input of the multiplexer 30 and to that of another multiplexer 36 of which it also constitutes one input. The other input of this multiplexer receives the value of the bit b6, the latter also forming one input of the multiplexer 30.

The multiplexer 32 selects the content of one of the extended instruction registers ix0 to ix3 in dependence upon the value of the bits b3 and b4. That content is placed in a temporary register 37 which transfers it to a multiplexing and transcoding circuit 38 set by the output of the multiplexer 36. This circuit forms the operation signal with which the address calculation circuit 28 has to work.

The bit from the field W (see table 1) of the configuration registers cx0 to cx3 is transferred via the register 23 and a line 39 to a circuit 40 for determining narrow or wide data words. This circuit is connected to the general application registers and to the memory 7.

Figure 6:
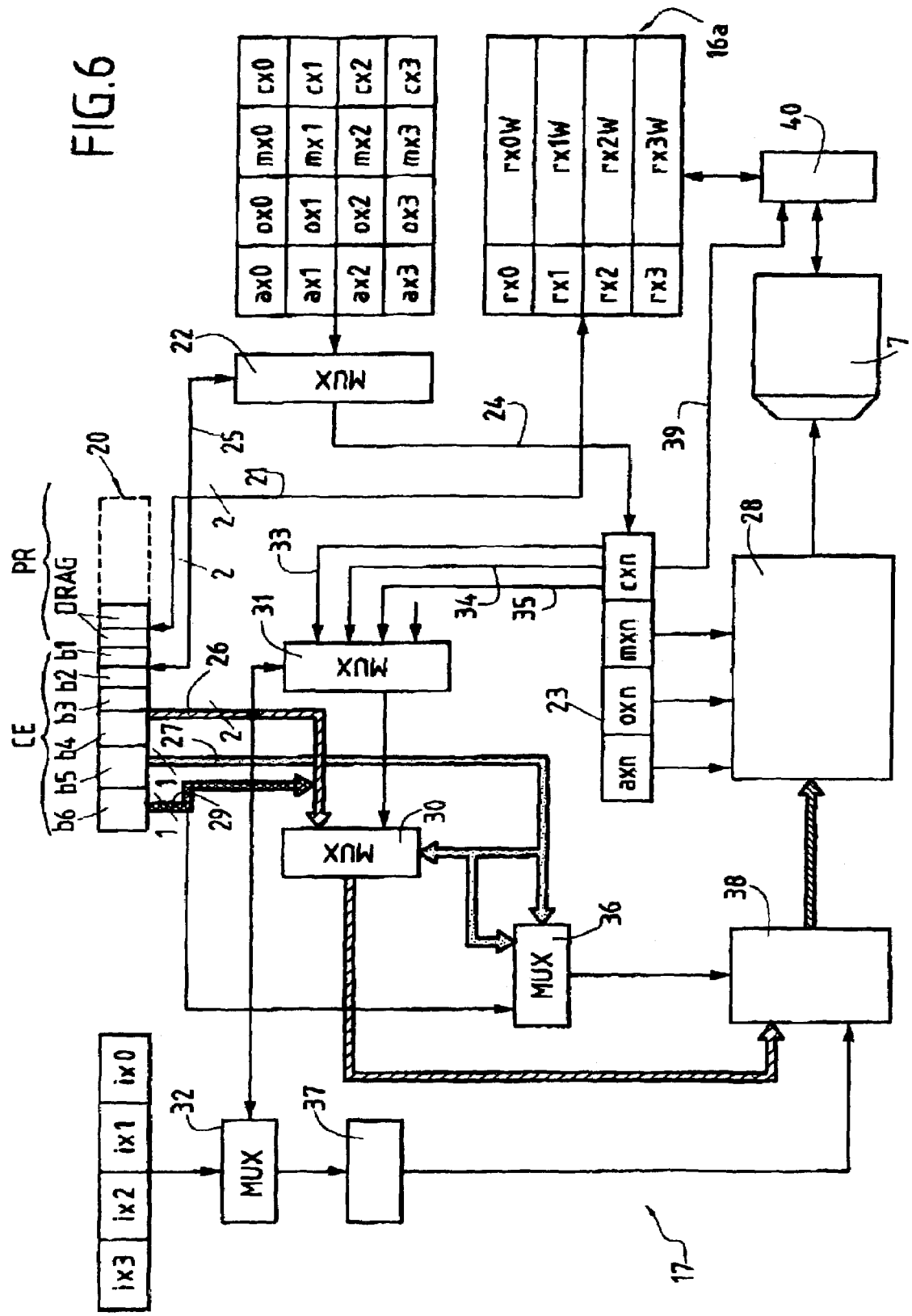
FIGS. 6 to 8 are block diagrams similar to FIG. 5 showing the circulation of information in three specific address generation modes.
Figure 7:
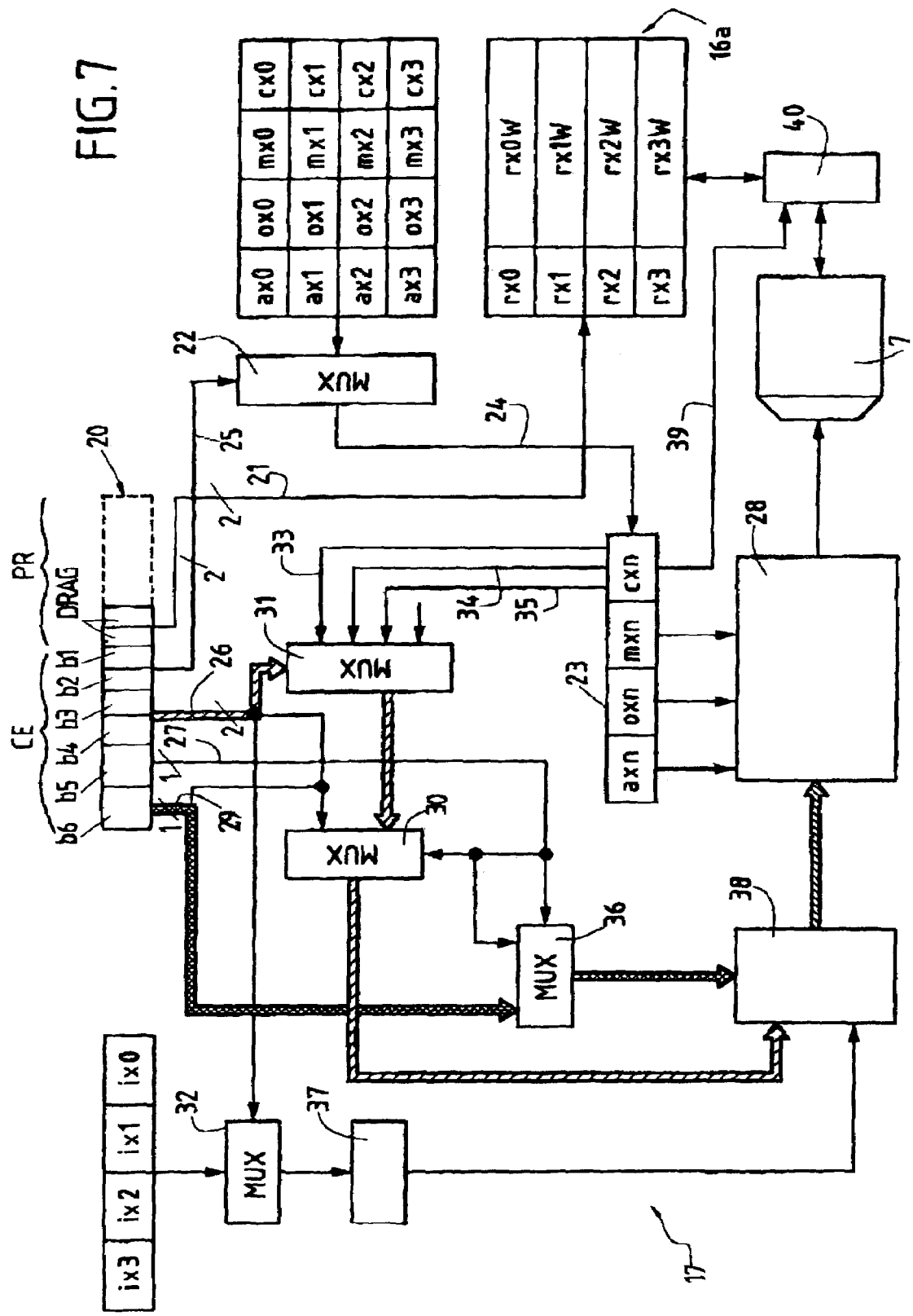
Figure 8:
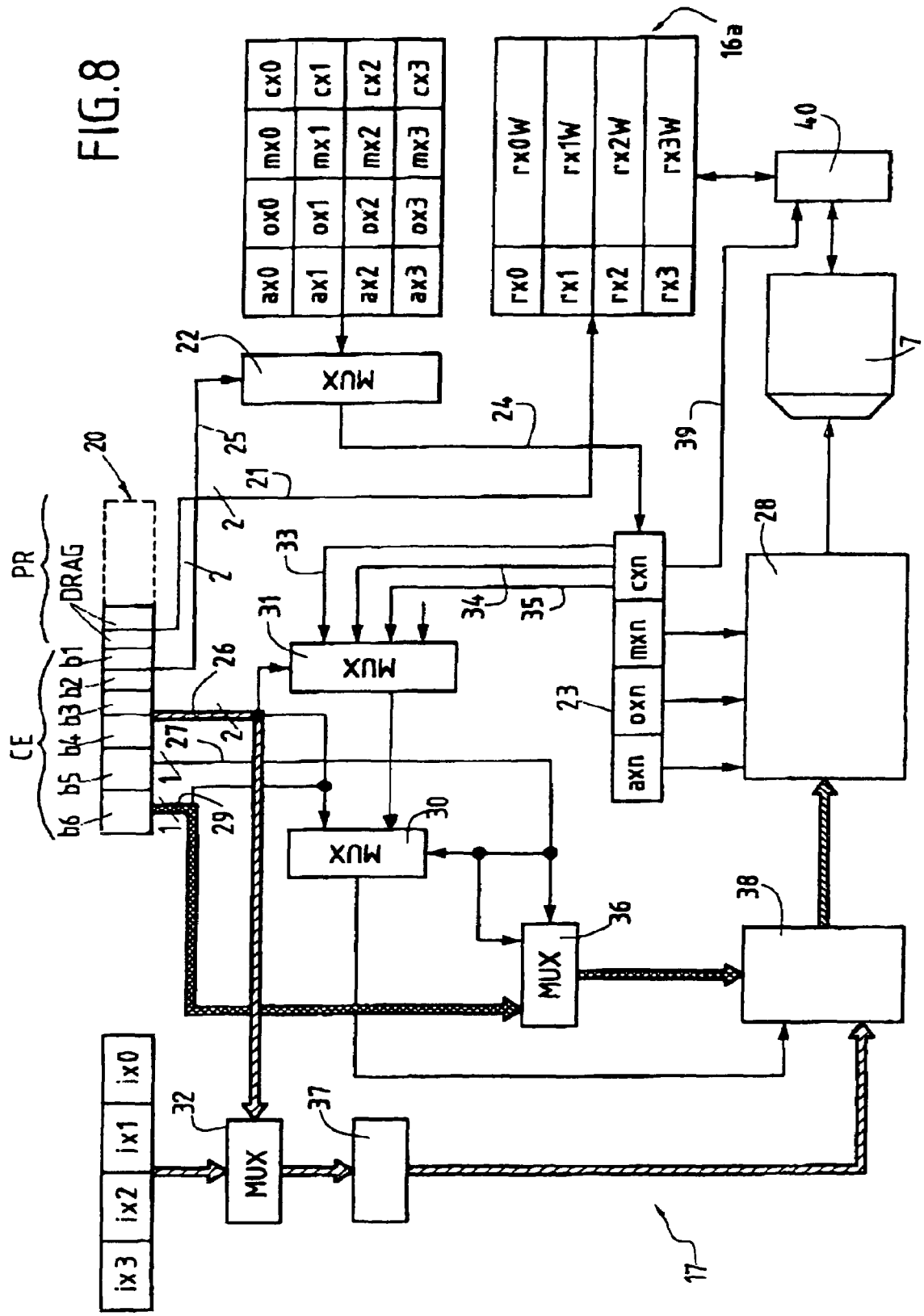

The unit 17 can thus operate in three different modes, shown in FIGS. 6, 7 and 8, respectively: basic mode, predefined mode, extended mode. These operating modes are now examined in succession, the circulation of the various types of information being shown by a wide double line identified each time by a particular form of shading.

In the basic mode (FIG. 6), the operation code of the calculation performed in the calculation circuit 28 is contained directly in the address generation code of the program instruction. It consists of seven basic operations and the NOP (no operation) code defined by the bits b3, b4 and b6. The multiplexers 30 and 36 are then transparent to the value of these three bits under the control of the bit b5. The operation code is applied to the multiplexing and transcoding circuit 38 which is also transparent to this code by applying the value of the bit b5. The basic operation code is therefore applied to the calculation circuit 28, which performs the calculation on the contents of the index, offset and modulo registers stored in the temporary register 23 at the time in question. These contents were selected by the values of the bits b1 and b2 setting the multiplexer 22.

FIG. 7 shows the execution of an address calculation using a predefined operation code. In this case, the multiplexing and transcoding circuit 38 is transparent to the input coming from the multiplexer 30 because of the value of the bit b6 passing through the multiplexer 36 set by the value of the bit b5.

The value of the bits b3 and b4 chooses one of the predefined operations in the configuration register cxn selected by the multiplexer 22 and placed in the corresponding field of the temporary register 23. The corresponding code passes through the multiplexers 31 and 30.

In the case of FIG. 8, the multiplexing and transcoding circuit 38 is transparent for the content of the temporary register 37 in which the content of one of the extended registers ix0 to ix3 is placed via the multiplexer 32. The latter is set by the value of the bits b3 and b4. As in FIG. 7, the transparency of the circuit 38 is assured by the value of the bit b5 that transmits the value of the bit b6 to the circuit 38.

Under the above conditions, the address calculation circuit 28 works with the instruction defined in the selected extended register, using the codes specified by way of example in table 2 above.

Thus to define the address generation code CE, each program instruction requires only six bits assigned a double function. For example, the bits b3, b4 and b6 are used to define the value of the operation code in the basic mode and to set multiplexers in the address generation system. The more complex address calculation operations are defined using dedicated registers as the configuration and extended instruction registers, which makes the programming possibilities very flexible, despite the small number of bits in the program instruction defining the address generation code. It should also be noted that the contents of the registers in question can be replaced at any time by other contents as called for by the requirements of algorithm execution.

The invention claimed is:

1. A system for generating addresses for a digital signal processor adapted to execute a program whose program instructions each include an address generation code for accessing at least one memory associated with said processor, said system comprising:

a set of address registers;

an address calculation circuit which calculates each access address to said at least one memory on the basis of at least one operation code designated by the address generation code of one of said program instructions and the content of one address register selected from said set of address registers, said address calculation circuit being configurable to perform a plurality of predetermined calculation operations in response to a plurality of predefined operation codes;

said address generation code defining said operation code to be sent to said address calculation circuit and designating the address register whose content must be subjected to a calculation operation; and a control component which selectively transfers to said address calculation circuit the contents of said address register designated by said address generation code and of said at least one operation code defined by said address generation code;

each address register of said set of address registers being further associated with a respective configuration register designated by said address generation code at the same time as said address register;

each of said configuration registers containing at least one set of predefined operation codes each adapted to control one of said plurality of predetermined calculation operations in said address calculation circuit; and said system being adapted to select a mode of transmission of the contents of said designated address register and of said at least one defined operation code to said address calculation circuit from several transmission modes that include a predefined mode, said control component in said predefined mode transferring to said address calculation circuit said designated address register and at least one predefined operation code of said set of predefined operation codes contained in the respective configuration register associated with said designated address register, said at least one predefined operation code being selected from said set of predefined operation codes by said control component in dependence upon the value of at least a first bit of said address generation code.

2. The system claimed in claim 1 wherein each configuration register comprises a plurality of fields each containing a set of predefined operation codes.

3. The system claimed in claim 2 wherein each configuration register comprises three fields each containing a set of predefined operation codes and wherein said predefined operation codes are defined on four bits.

4. The system claimed in claim 1, further including a set of extended instruction registers for selectively executing complex address calculation operations in said address calculation circuit, said control component being adapted, in dependence upon a second predetermined bit of said address generation code, to transfer to said address calculation circuit either said at least one predefined operation code contained in said respective configuration register associated with said designated address register to execute a predefined address calculation operation according to said predefined mode, or the content of one of said extended instruction registers to execute a complex calculation operation defined by that content according to an extended transmission mode of said transmission modes, said control component further being adapted, in dependence upon at least a third predetermined bit of said program instructions, to designate one of said extended instruction registers of said set of extended instruction registers to transfer a content thereof to said address calculation circuit for execution of a complex calculation operation according to the extended transmission mode.

5. The system claimed in claim 4, wherein each configuration register comprises a plurality of fields each containing a set of predefined operation codes and wherein said first and third bits of said address generation code occupy the same position in said program instruction and are used to designate, in dependence upon the value of said second bit, either respective fields of said configuration registers or a respective extended instruction register in said set of extended instruction registers.

6. The system claimed in claim 1, wherein said control component is adapted to select an address operation code designating a plurality of frequent calculation operations during the execution of said program in dependence upon the value of at least a fourth bit of said address generation code applied to said address calculation circuit.

7. The system claimed in claim 6 wherein said frequent calculation operations are defined by said first or third bit and said second bit.

8. The system claimed in claim 5 wherein said address generation code contains two bits for selecting said configuration registers and said extended instruction registers.

9. The system claimed in claim 1, for use in a digital signal processor adapted to operate selectively in a narrow data word mode or a wide data word mode, which data words can be stored temporarily in a set of general application registers, wherein each of said configuration registers includes a field defining one or the other of said data word modes.

10. A digital signal processor including an address generation system as claimed in claim 1.

11. A system for generating addresses for a digital signal processor adapted to execute a program whose program instructions each include an address generation code for accessing at least one memory associated with said processor, said system comprising:
   a set of address registers;
   an address calculation circuit which calculates each access address to said at least one memory on the basis of at least one operation code designated by the address generation code of one of said program instructions and the content of one address register selected from said set of address registers on the basis of said address generation code, said address calculation circuit being configurable to perform a plurality of predetermined calculation operations in response to a plurality of predefined operation codes;
   a control component which selectively transfers to said address calculation circuit the contents of said address register designated by said address generation code and said at least one operation code defined by said address generation code;
   each address register of said set of address registers being further associated with a respective configuration register designated by said address generation code at the same time as said address register;
   each of said configuration registers containing at least one set of predefined operation codes each adapted to control one of said plurality of predetermined calculation operations in said address calculation circuit; and
   said system being adapted to select a mode of transmission of the contents of said designated address register and of said at least one defined operation code to said address calculation circuit from several transmission modes that include a basic mode and a predefined mode, said control component in said basic mode transferring to said address calculation circuit said designated address register and said at least one operation code defined by said address generation code, said control component in said predefined mode transferring to said address calculation circuit said designated address register and at least one predefined operation code of said set of predefined operation codes contained in the respective configuration register associated with said designated address register, said at least one predefined operation code being selected from said set of predefined operation codes by said control component in dependence upon the value of at least a first bit of said address generation code.

12. The system claimed in claim 11, further including a set of extended instruction registers for selectively executing complex address calculation operations in said address calculation circuit, said control component being adapted, in dependence upon a second predetermined bit of said address generation code, to transfer to said address calculation circuit either said at least one predefined operation code contained in said respective configuration register associated with said designated address register to execute a predefined address calculation operation according to said predefined mode, or the content of one of said extended instruction registers to execute a complex calculation operation defined by that content according to an extended transmission mode of said transmission modes.

13. The system claimed in claim 12, wherein said control component is further adapted, in dependence upon at least a third predetermined bit of said program instructions, to designate one of said extended instruction registers of said set of extended instruction registers to transfer a content thereof to said address calculation circuit for execution of a complex calculation operation according to the extended transmission mode.

14. The system claimed in claim 12, wherein each configuration register comprises a plurality of fields each containing a set of predefined operation codes and wherein said first and third bits of said address generation code occupy the same position in said program instruction and are used to designate, in dependence upon the value of said second bit, either respective fields of said configuration registers or a respective extended instruction register in said set of extended instruction registers.

15. A system for generating addresses for a digital signal processor adapted to execute a program whose program instructions each include an address generation code for accessing at least one memory associated with said processor, said system comprising:

- a set of address registers, each of said address registers having an associated configuration register designated by said address generation code;
- an address calculation circuit which calculates each access address to said at least one memory on the basis of at least one operation code at least partly defined by the address generation code of one of said program instructions and the content of one address register selected from said set of address registers on the basis of said address generation code, said address calculation circuit being configurable to perform a plurality of predetermined calculation operations in response to a plurality of predefined operation codes;
- a control component which selectively transfers to said address calculation circuit the contents of said address register designated by said address generation code and said at least one operation code;
- each of said configuration registers containing at least one set of predefined operation codes each adapted to control one of said plurality of predetermined calculation operations in said address calculation circuit; and
- said system being adapted to select a mode of transmission of the contents of said designated address register and of said at least one operation code to said address calculation circuit from a plurality of transmission modes that include a basic mode in which said control component transfers the content of said designated address register and said at least one operation code as defined only by said address generation code to said address calculation circuit, and at least one complex mode in which said control component transfers the content of said designated address register and in which a content of dedicated registers are used to fully define the operation code.

16. The system claimed in claim 15, wherein said complex mode includes a predefined mode in which at least one of said predefined operation codes within said set of predefined operation codes contained in the respective configuration register associated with said designated address register is selected by said control component in dependence upon the value of at least a first bit of said address generation code.

17. The system claimed in claim 16, wherein said system further includes a set of extended instruction registers and said complex mode includes an extended mode in which said set of extended instruction registers are used to fully define said operation code for execution of calculation operations in said address calculation circuit, said control component being adapted, in dependence upon a second predetermined bit of said address generation code, to transfer to said address calculation circuit either said at least one predefined operation code contained in said respective configuration register associated with said designated address register to execute a predefined address calculation operation according to said predefined mode, or the content of one of said extended instruction registers to execute a complex calculation operation defined by said content according to said extended transmission mode.

18. The system claimed in claim 17, wherein said control component is further configured, in dependence upon at least a third predetermined bit of said program instructions, to designate one of said extended instruction registers of said set of extended instruction registers to transfer a content thereof to said address calculation circuit for execution of a complex calculation operation according to the extended transmission mode.

19. The system claimed in claim 18, wherein each configuration register comprises a plurality of fields each containing a set of predefined operation codes and wherein said first and third bits of said address generation code occupy the same position in said program instruction and are used to designate, in dependence upon the value of said second bit, either respective fields of said configuration registers or a respective extended instruction register in the set of extended instruction registers.

20. The system claimed in claim 14, wherein said system includes a set of extended instruction registers and said complex mode includes an extended mode in which said set of extended instruction registers are used to fully define said operation code for execution of complex address calculation operations in said address calculation circuit.

21. The system claimed in claim 1, wherein said plurality of predetermined calculation operations includes addition and multiplication operations.

22. The system claimed in claim 1, wherein said plurality of predetermined calculation operations includes addition and subtraction operations.

* * * * *